United States Patent [19]

Amano et al.

[11] Patent Number: 5,128,383

[45] Date of Patent: Jul. 7, 1992

[54] PROCESS OF PRODUCING THERMOPLASTIC POLYESTER SERIES RESIN FOAMED MATERIAL

[75] Inventors: Norio Amano; Takeshi Taki; Takaaki Hirai, all of Nara, Japan

[73] Assignee: Sekisui Kaseihin Kogyo Kabushiki Kaisha, Nara, Japan

[21] Appl. No.: 792,577

[22] Filed: Nov. 15, 1991

Related U.S. Application Data

[62] Division of Ser. No. 655,691, Feb. 15, 1991.

[30] Foreign Application Priority Data

Feb. 16, 1990 [JP] Japan ................. 2-36768
Jul. 3, 1990 [JP] Japan ................. 2-175923

[51] Int. Cl.⁵ .............................. C08J 9/36
[52] U.S. Cl. ............................ 521/182; 521/918
[58] Field of Search ..................... 521/182, 918

[56] References Cited

U.S. PATENT DOCUMENTS

| | | | |
|---|---|---|---|
| 4,230,759 | 10/1980 | Kouffman et al. | 264/55 |
| 4,462,947 | 7/1984 | Huggard | 264/54 |
| 4,466,933 | 8/1984 | Huggard | 264/321 |
| 4,585,605 | 4/1986 | Kadota et al. | 264/55 |

FOREIGN PATENT DOCUMENTS

| | | | |
|---|---|---|---|
| 54-117568 | 9/1979 | Japan | 264/55 |
| 62-021525 | 1/1987 | Japan | 264/55 |

*Primary Examiner*—Morton Foelak
*Attorney, Agent, or Firm*—Armstrong, Nikaido, Marmelstein, Kubovcik & Murray

[57] ABSTRACT

A process of producing a thermoplastic polyester series resin foamed material is disclosed, which comprises heating and further foaming a thermoplastic polyester resin foamed material having a crystallinity of not higher than 30% by bringing into contact with water or steam of at least 60° C. and then heating the foamed material by bringing into contact with a heating medium other than water of at least 100° C. to further foaming the foamed material. A process of producing a thermoplastic polyester series resin foamed material is also disclosed, which comprises heating and further foaming a thermoplastic polyester series resin foamed material having a crystallinity of not higher than 30% by bringing into contact with water to steam of at least 60° C., heating and further foaming the foamed material by bringing into contact with a heating medium other than water of at least 100° C., and molding the foamed material by a mold.

2 Claims, 3 Drawing Sheets

PROCESS OF PRODUCING THERMOPLASTIC POLYESTER SERIES RESIN FOAMED MATERIAL

This is a division, of application Ser. No. 07/655,691 filed Feb. 15, 1991.

FIELD OF THE INVENTION

This invention relates to a process of producing a thermoplastic polyester series resin foamed material or a molding thereof. More particularly, the invention relates to a process of producing a thermoplastic polyester series resin foamed material or a molding thereof having uniform and fine cells therein, a high expansion ratio, an excellent heat resistance, and a high rigidity. The foamed material or molding thereof obtained by the process of this invention has a low density, a light weight, a high rigidity, and an excellent heat resistance as well as is excellent in heat insulation and chemical resistance. Thus, the moldings are suitably used for heat-resisting food vessels or medical articles which are not deformed when a retort treatment of performing heat sterilization by steam is applied thereto.

BACKGROUND OF THE INVENTION

A thermoplastic polyester series resin (hereinafter, is referred to as PAT) is known as an engineering plastic and has excellent properties which are lacking in polystyrene and polyethylene. For example, PAT has a large rigidity, a good form stability, and an excellent heat resistance of enduring 200° C. Thus, it was tried to make tough heat-insulating materials, cushioning materials, package containers, food containers, etc., having good heat resistance by foaming PAT. However, different from polystyrene and polyethylene, it was not easy to foam PAT. Even when PAT can be foamed, the foamed material has a low expansion ratio only.

The reason that PAT is reluctant to be foamed is by the crystallinity of PAT and is that it is difficult to keep the viscosity of PAT suitable for foaming when PAT is melted. More specifically, when PAT is heated, PAT is suddenly softened at a certain temperature to become a liquid having a low viscosity. That is, for PAT, the temperatures suitable for foaming are limited to a very narrow temperature range and, hence, it is difficult to keep PAT at a temperature suitable for foaming. Also, when PAT becomes a liquid having a low viscosity, a gas acting as a foaming agent is immediately released therefrom. Therefore, even when PAT can be foamed, the expansion ratio is very low and it is difficult to make foamed materials of PAT of low density foamed at a high expansion ratio.

For solving these problems, various attempts have been made. For example, it was proposed to mix an epoxy compound with PAT or mix a metal belonging to group Ia or group IIa of the periodic table with PAT. However, by these proposals, large-sized foamed materials foamed at a high expansion ratio could not be obtained.

Also, JP-A-59-135237 (the term "JP-A" as used herein means an "unexamined published Japanese patent application") and U.S. Pat. No. 4,462,947 propose the use of high-molecular weight chain aromatic polycarbonate as a foaming agent for obtaining PAT foamed materials. However, by these techniques, foamed materials having a high expansion ratio cannot be obtained. In fact, in the above-cited patents, as an example of the foamed material obtained, only a material having a density of about 0.83 g/cm$^3$ is described.

As other attempt, JP-A-55-2045 describes a method of obtaining a foamed material having a low density by introducing high-temperature PAT containing a foaming agent directly after being extruded from an extruding machine into a reduced pressure zone and foaming it under reduced pressure. However, since high-temperature PAT containing a foaming agent generally has uneven surfaces by foaming and has an irregular external form, it is not easy to construct a reduced pressure zone capable of continuously passing such high-temperature PAT. In particular, it is difficult to make sufficiently reduced-pressure sealing of the outlet of the foamed material. Accordingly, the aforesaid method has a disadvantage of being not easily practiced.

SUMMARY OF THE INVENTION

An object of this invention is to provide a process of producing a low-density PAT foamed material or a molding thereof having a high expansion ratio by solving the problems associated with the conventional techniques.

Another object of this invention is to provide a process of easily producing a low-density PAT foamed material or a molding thereof.

A still another object of this invention is to provide a process of producing a low-density PAT foamed material having uniform fine cells therein.

A further object of this invention is to provide a process of producing moldings such as food containers composed of a PAT foamed material having a heat resistance. In particular, the invention is to provide a process of producing a food container having a heat resistance enduring retort treatment.

As the result of various investigations for attaining the aforesaid objects, the present inventors have discovered that by foaming PAT plural times and employing a different means in each time, PAT can be foamed at a high expansion ratio.

More particularly, it has been discovered that the first foaming, that is, the primary foaming of PAT may be carried out by any desired means, the foamed material thus obtained is quenched to provide a foamed material having a crystallinity of not higher than 30%, then, the foamed material is heated by directly bringing into contact with water or steam of at least 60° C. to further foam the foamed material and, thereafter, successively or after once cooling, the foamed material is heated to a temperature of at least 100° C. by bringing into contact with other heating medium than water, whereby a PAT foamed material foamed at a high expansion ratio is obtained.

Furthermore, as the result of further continuing the investigations, the inventors have discovered that the food containers formed from the PAT foamed sheet obtained by carrying out foaming of PAT plural times as described above using an inorganic gas as a foaming agent have a more improved heat resistance and endure a retort treatment without being further foamed and deformed by the application of the retort treatment.

The present invention has been made based on the aforesaid discoveries.

That is, the present invention is to provide a process of producing a PAT foamed material, which comprising heating a PAT foamed material having a crystallinity of not higher than 30% by bringing into contact with water or steam of at least 60° C. to further foam the foamed material and then heating the foamed material by bringing into contact with a heating medium other than water kept at a temperature of at least 100° C. to further foam the foamed material. In other words, when a PAT foamed material having a crystallinity of not more than 30% in the state containing a prescribed amount of water is heated by a heating medium other than water, the foamed material is further foamed.

Also, according to another embodiment of this invention, there is provided a process of producing a molding of a PAT foamed material, which comprises heating a PAT foamed material having a crystallinity of not higher than 30% by bringing into contact with water or steam of at least 60° C. to further foam the foamed material, heating the foamed material by bringing into contact with a heating medium other than water kept at a temperature of at least 100° C. to further foam the foamed material, and then molding the foamed material by a mold.

BRIEF DESCRIPTION OF THE DRAWINGS

FIG. 3 shows electron microscopic photographs of the cross-section of the primarily foamed material of Example 1, in which

FIG. 4 shows electron microscopic photographs of the cross-section of the thirdly foamed material of Example 1, in which

DETAILED DESCRIPTION OF THE INVENTION

In this invention, a PAT foamed material which is used as a starting material has a crystallinity of not higher than 30%. For making such a foamed material, PAT is softened by heating, a foaming agent is mixed therein under pressure, the composition thus obtained is placed in a low-pressure zone to foam the composition, and the PAT foamed material is quenched to a temperature not higher than the glass transition point of PAT directly after foaming.

PAT for use in this invention is a high-molecular weight chain ester obtained by reacting an aromatic dicarboxylic acid and a dihydric alcohol.

As the aromatic dicarboxylic acid, terephthalic acid is most frequently used, but isophthalic acid or 2,6-naphthalenedicarboxylic acid can be used. Also, as other dicarboxylic acids, diphenyl ether dicarboxylic acid, diphenylsulfonedicarboxylic acid, and diphenoxydicarboxylic acid can be used.

Also, as the dihydric alcohol, ethylene glycol is mainly used but trimethylene glycol, tetramethylene glycol, neopentylene glycol, hexamethylene glycol, cyclohexanedimethylol, tricyclodecanedimethylol, 2,2-bis-(4-β-hydroxyethoxyphenyl)propane, 4,4,-bis(α-hydroxyethoxy)diphenylsuflone, and diethylene glycol can be used.

Furthermore, such PAT is commercially available and the commercially available PAT's can be used in this invention.

In the aforesaid PATs, polyethylene terephthalate, polybutylene terephthalate, a polybutylene terephthalate elastomer, an amorphous polyester, polycyclohexane terephthalate, etc., are suitable for use in this invention. Also, the aforesaid PAT's may be used singly or as a mixture thereof. Also, the aforesaid PAT's may be used together with other resin. In the case of using other resin, it is necessary that the amount of other resin is less than that of PAT. Since PAT is a resin which is generally liable to be hydrolyzed at a high temperature, in the case of foaming PAT, it is preferred to previously dry PAT. At drying, a dehumidifying dryer is preferably used. In the drying condition in the aforesaid case, air having a dew point of, e.g., −30° C. is heated to 160° C. and PAT can be dried by exposing to the air for about 4 hours.

As a foaming agent for foaming PAT, various foaming agents can be used in this invention. They can be generally classified into a solid compound which is decomposed at a temperature of the softening point of PAT or higher to generate a gas, a liquid which is vaporized in PAT by heating, and an inorganic gas. The materials classified as above can be all used in this invention.

Examples of the aforesaid solid compound are azodicarbonamide, dinitrosopentamethylenetetramine, hydrozocarbonamide, and sodium bicarbonate. Examples of the aforesaid liquid which is vaporized are saturated aliphatic hydrocarbons such as hexane, pentane, butane, etc.; aromatic hydrocarbons such as benzene, xylene, etc.; and halogenated hydrocarbons such as methylene chloride, Freon (a trade name, made by E.I Du Pont de Nemours and Company), etc. Also, examples of the inorganic gas are carbon dioxide, nitrogen, air, neon, argon, helium, etc. Also, as other foaming agent, the high-molecular weight chain aromatic polycarbonate described in JP-A-59-135237 can be used.

For incorporating a foaming agent in PAT, when the foaming agent is a liquid, PAT may be immersed in the liquid foaming agent at atmospheric pressure but for facilitating the impregnation of the foaming agent, it is necessary to immerse PAT in the foaming agent under heating while preventing the evaporation of the foaming agent and, hence, PAT must be immersed in the foaming agent under heating and under pressure. For immersing PAT in the foaming agent under heating and under pressure, it is preferred that PAT is previously melted and that the foaming agent is incorporated under pressure in the melt. For this purpose, it is advantageous to melt PAT using an extruding machine and incorporate under pressure the foaming agent in the melted PAT from an intermediate portion of the extruding machine. Also, the use of an extruding machine is convenience since simultaneously with incorporating under pressure the foaming agent in PAT, PAT can be extruded and molded as it is and, further, at the same time can be foamed.

Also, for incorporating an inert inorganic gas in PAT, PAT is melted and the inorganic gas is incorporated under pressure in the melt. For this purpose, it is advantageous that PAT is melted in an extruding machine and that the foaming agent is incorporated under pressure from the intermediate portion of the barrel of the extruding machine. The use of such an extruding machine is more advantageous since simultaneously with incorporating under pressure the foaming agent in PAT, the PAT can be extruded and formed as it is.

The foaming thus carried out is the primary foaming and the foamed material obtained is the foamed material which is used as the starting material in the process of this invention.

PAT foams at a low expansion ration by the primary foaming. The expansion ratio of about twice by an ordinary extrusion foaming and is only about 5 times even by foaming at a particular expansion ratio. Thus, for foaming the foamed material at a higher expansion ratio, the foamed material is further foamed by other means in this invention.

In this invention, the PAT foamed material by the primary foaming having a crystallinity of not higher than 30%, particularly preferably not higher than 20%, is used. For restraining the crystallinity at not higher than 30%, the PAT foamed material of high temperature directly after being foamed by extrusion is quenched to the glass transition point of PAT or lower. The glass transition point of PAT differs according to the kind of the aromatic dicarboxylic acid and the kind of the dihydric alcohol constituting PAT but is generally in the range of from 30° C. to 100° C. Thus, for restraining the crystallinity of the foamed PAT at not higher than 30%, the PAT foamed material must be quenched to not higher than 30° C.

When the foamed material by the primary foaming is quenched, the foamed material is solidified without a time for crystallization, whereby the crystallinity becomes low. The crystallinity differs according to the cooling extent, that is, differs according to the kind and temperature of a cooling medium and the contact state with the cooling medium. When the PAT primarily foamed material obtained by extrusion is cooled by direct contact with water of normal temperature, the crystallinity of the primarily foamed material becomes from a few percent to ten and several percent, which is usually not higher than 30%. However, the primarily foamed material obtained by extrusion is introduced on a metal mold for only regulating the form thereof and the metal mold is not forcibly cooled, the foamed material is not quenched, whereby the crystallinity becomes higher than 30%. Consequently, in the case of obtaining the primarily foamed material by extrusion, the primarily foamed material is not allowed to spontaneously cool but cooled by advancing it along a metal mold forcibly cooled.

In general, the crystallinity of a resin can be measured by measuring the density, the X-ray diffraction patterns, the nuclear magnetic resonance spectra, etc., but since a foamed resin contains cells therein, the crystallinity thereof cannot be measured by these methods. However, favorably, in the case of a PAT foamed material, it has been confirmed that the crystallinity thereof can be accurately measured in the order of 1% by a thermal method of measuring the heat of fusion. The principle is that when a PAT foamed material is heated at a constant rate, the non-crystallized portion is first crystallized to generate a heat and, thereafter, the crystals are melted to absorb the heat of fusion and, hence, the crystallinity is calculated from the generated heat and the absorbed heat. Practically, the low-temperature crystallization heat quantity generated at the first crystallization and the melting heat quantity absorbed at melting are measured and the crystallinity is calculated by compared the measured values with the quantity of heat shown by a standard complete article.

In the case of practically measuring the low-temperature crystallization heat quantity and the melting heat quantity of a PAT foamed material, the measurement is preferably made by a differential scanning heat quantity measuring method. In the differential scattering heat quantity measuring method, heaters for a sample being measured and for a standard article function independently and when a temperature difference occurs between both the heaters during the step of heating at a constant rate, either mechanism of increasing or controlling the quantity of heat acts automatically to compensate them, whereby the heat flow rate difference is directly recorded. The crystallinity is theoretically calculated by the following equation.

$$Crystallinity\ (\%) = (A - B)/C \times 100$$

A: melting heat quantity per mol
B: low-temperature crystallization heat quantity per mol
C: melting heat quantity per mol of a complete PAT crystal In this case, the melting heat quantity per mol of a complete PAT crystal is described to be 26.9 KJ with respect to polyethylene terephthalate according to *Kobunshi (High Molecule) Data Handbook*, published by Baifukan and this value is used in this invention.

In this invention, the PAT foamed material having a crystallinity of not higher than 30% is further subjected to secondary foaming. The secondary foaming is carried out by heating the aforesaid PAT foamed material by bringing into contact with water or steam of at least 60° C. It is preferred that the contact time of the PAT foamed material with water or steam is controlled such that the foamed material obtained by the secondary foaming has a crystallinity of not higher than 30%. For this purpose, when the temperature of water or steam being used is high, the contact time is shortened, while when the temperature thereof is low, the contact time is prolonged. In addition, for measuring the crystallinity of the secondarily foamed material, within 10 seconds after the secondary foaming, the foamed material is quenched by immersing it in water of 20° C. for one minute and, thereafter, the crystallinity thereof is measured according to the aforesaid method.

The reason for using water or steam for the secondary foaming is that the water molecules are somewhat incorporated in the cells of the PAT foamed material. According to our experiments, it has been confirmed that when the water content in the cells is at least 2,000 ppm and preferably at least 3,000 ppm, the secondarily foamed material is more foamed when the PAT is, thereafter, heated to a higher temperature. On the other hand, even when the water content is 2.5%, the further foaming may be performed, but the water content is preferably not higher than 1%.

Also, the reason for limiting the heating temperature for the secondary foaming is limited to at least 60° C. is that PAT is softened at a temperature of 60° C. or higher and water enters the cells in the PAT foamed material. Also, it is preferred that the secondary foaming is carried out under substantially atmospheric pressure and if water of steam under pressure is used, it sometimes happens that the cells in the PAT foamed material are reluctant to expand by being pressed by the surrounding pressure.

The water content in the cells of the foamed material can be measured by various methods. For example, it can be measured by a method of reducing weight by heating, a Karl Fischer's method, etc. However, in this invention, a 903 type H water content meter (made by E.I. Du Pont de Nemour and Company). The water content meter is constituted by an over and an electrolytic cell and the principle is that a foamed material is placed in the oven, a dry nitrogen gas is flown as a carried gas to remove, first, water attached to the surface thereof, the oven is heated to melt the foamed material, and moisture generated at the case is measured. The water-containing nitrogen gas generated is introduced into the electrolytic cell, wherein water is adsorbed by phosphorous pentoxide and, thereafter, the water is electrolyzed into hydrogen and oxygen, whereby the amount of water is measured.

In this invention, simultaneously with secondary foaming with the contact of water or stream, the foamed material is impregnated with water. The foamed material thus obtained is subjected to a third foaming. The third foaming may be carried out in succession to the secondary foaming or may be carried out after once cooling the foamed material obtained by the secondary foaming. Also, the third foaming can be carried out in a mold, whereby foaming and molding are performed simultaneously.

The third foaming is carried out using a heating medium other than water and the heating medium is heated to a temperature of 100° C. or higher.

As the heating medium, various materials such as a solid, a liquid, a gas, etc., can be used.

As the solid, plates of various kinds of metals such as aluminum, copper, iron, etc., can be used; as the liquid, those having a boiling point of at least 100° C. such as silicone oil, melts of low-melting point alloys, etc., can be used; and as the gas, nitrogen, a carbon dioxide gas, air, etc., can be used.

In these heating media, metal-made plates are preferably used. When a metal-made plate is used, the surface of the foamed material is smoothened and the thickness of the foamed material is liable to make uniform.

In the third foaming, the temperature of the heating medium is at least 100° C. The reason of setting the temperature at 100° C. or higher is based on our experimental results. That is, when the heating medium for the third foaming is lower than 100° C., the PAT foamed material is not actually foamed well. This is considered to be related with water or steam used at the secondary foaming. That is, since the PAT foamed material is heated with water or steam at the secondary foaming, water or steam exists in the cells in the foamed material and it is considered that when the PAT foamed material is heated to a temperature of at least 100° C., water in the cells is vaporized again to expand the cells, which results in further expanding the foamed material.

The third foaming can be repeatedly carried out until the crystallinity of the PAT foamed material reaches 30%. The foamed material thus obtained is expanded at least 10 times and in a greatly expanded case, the foamed material is expanded at least 30 times. The cells of the foamed material thus obtained are generally small and uniform. Also, by practicing the above-described operation, a large foamed material can be easily obtained.

At the practice of this invention, PAT may contain various additives. Examples include a small amount of a talc powder as a bubble controlling agent; epoxy compounds such as diglycidyl terephthalate, etc. and compounds having at least two acid anhydride groups in one molecule such as pyromellitic anhydride, benzophenonetetracarboxylic acid dianhydride, cyclopentanetetracarboxylic acid dianhydride, diphenylsulfonetetracarboxylic acid dianhydride, etc., for improving the melting characteristics of PAT; compounds of metals belonging to groups I, II, and III of the periodic table, such as sodium carbonate, etc.; coloring agents; antistatic agents; flame retarders, etc.

Also, after practicing the process of this invention, the foamed material obtained can be kept at a high temperature of, e.g., 200° C., to increase the crystallinity of PAT, whereby a highly foamed heat resisting PAT foamed material can be also obtained.

As described above, according to the process of this invention, a primarily foamed material of PAT obtained by previously performing the primary foaming according to an ordinary manner is subjected to the secondary foaming and the third foaming as described above and, hence, a highly foamed material having a low density can be obtained. Furthermore, since the crystallinity of the primarily foamed material is used as the starting material, PAT is liable to foam at a low temperature and, hence, the primarily foamed material can be foamed in the secondary foaming at a low temperature as 60° C. Also, in the secondary foaming, the PAT foamed material is brought into contact with water or steam at substantially atmospheric pressure, whereby the primarily foamed material is smoothly foamed well without crushing the cells in the foamed material by external pressure.

Furthermore, since in the secondary foaming, the primarily foamed material is brought into contact with water or steam, water exists in the cells of the secondarily foamed material. Also, since in the third foaming, the secondarily foamed material is brought into contact with a heating medium other than water at a temperature of at least 100° C., water existing in the cells of the foamed material is vaporized or expanded to further expand the cells, whereby the secondarily foamed material can be further foamed.

Also, the PAT foamed material thus obtained has uniform and fine cells therein. Therefore, according to the process of this invention, a foamed material which is uniformly and finely foamed and has a low density can be obtained. Furthermore, since the foamed material is made of PAT and PAT itself is a tough and highly heat resisting resin, the foamed material obtained has excellent properties such as toughness, heat resistance, heat insulation, and light weight and, hence, the foamed material can be utilized for various fields as plates or containers.

Also, according to this invention, if at foaming PAT as a raw material by extrusion, an inorganic gas is used as the foaming agent, the foaming gas does not remain in the foamed material and, hence, a molding of a foamed material capable of enduring a heat sterilizing treatment with steam can be obtained.

The process of this invention gives the excellent effect, which is not obtained by other processes, in the point of giving the PAT foamed material molding capable enduring the heat sterilizing treatment with steam.

Accordingly, the moldings of the PAT foamed materials obtained by the process of this invention are suitable as materials for food containers, medical supplies, etc.

Furthermore, since according to the process of this invention, the secondary foaming is carried out by bringing into contact with water or steam of at least 60° C. and the third foaming is carried out by bringing contact with a heating medium other than water of at heat 100° C., the secondary foaming and the third foaming can be continuously carried out in succession to the primary foaming. Thus, in the process of this invention, the foaming steps can be industrially easily practiced in the point of enabling continuously the foaming steps.

Thus, the process of this invention gives large advantages.

Then, the following examples and comparison examples are intended to practically illustrate the excellent points of this invention but not to limit it in any way. All parts therein are by weight.

EXAMPLE 1

Production of Primarily foamed Material:

Polyethylene terephthalate (TR8580, a trade name of Teijin Limited) was used as PAT and the following composition was prepared.

| PAT | 100 parts |
|---|---|
| Talc | 0.6 part |
| Pyromellitic Anhydride | 0.35 part |
| Sodium Carbonate | 0.1 part |

The above-described components were placed in an extruding machine having a diameter of 65 mm and extruded at a supply portion temperature of 280° C., a compressing portion temperature of 285° C., a melting portion temperature of 270° C., a head portion temperature of 275° C., and a die temperature of 270° C. and at a screw revolution number of 25 rpm. In this case, 1.3 parts of butane was incorporated under pressure in the extruding machine as a foaming agent from an intermediate portion of the extruding machine. Also, an annular die having an aperture of 60 mm and a slit width of 0.4 mm was used. Also, a plug having a diameter of 205 mm and a length of 740 mm was equipped to the top of the die and quenched with water of 25° C.

The foamed sheet thus obtained was opened by cutting to form a flat sheet, the sheet was once wound around a roll to provide a primarily foamed material. The thickness of the primarily foamed material was 1.3 mm and the density thereof was 0.27 g/cm$^3$. Also, the crystallinity of the primarily foamed material was 8%, and the water content thereof was 2400 ppm.

Figure 3A:
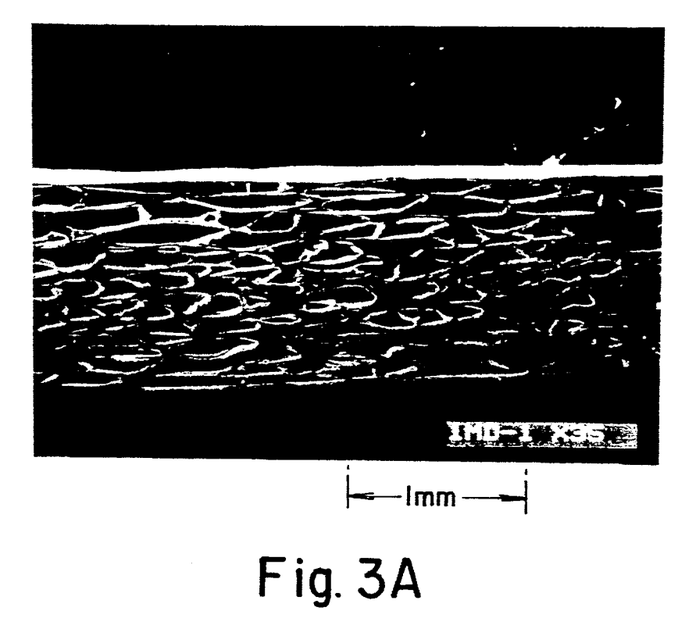
FIG. 3A shows the cross-section in the machine direction.
Figure 3B:
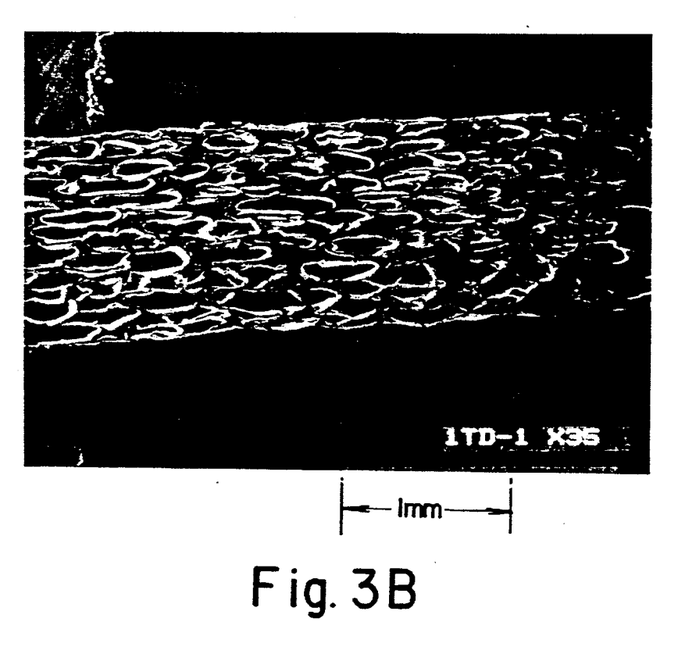
FIG. 3B shows the cross-section in the transverse direction.

Electron microscopic photographs of the cross-section of this primarily foamed material are in FIG. 3, in which FIG. 3A shows the cross-section in the machine direction, and FIG. 3B shows the cross-section in the transverse direction.

Production of Secondarily foamed Material:

Thereafter, the primarily foamed material was into contact with steam of 100° C. to further foam the material to provide a secondarily foamed material. The thickness of the secondarily foamed material was 44 mm, the density thereof was 0.079 g/cm$^3$, and the crystallinity was 22%.

Production of Thirdly foamed Material:

After 5 minutes since the production of the secondarily foamed material, the secondarily foamed material was placed between two iron plates of 180° C. and pressed at a pressure of 21 g/cm$^2$ for 30 seconds to provide a thirdly foamed material. The thirdly foamed sheet had a width of 600 mm, a length of 1000 mm, a thickness of 7.3 mm, a density of 0.048 g/cm$^3$, and an expansion ratio of 28 times. In addition, the water content of the foamed material before the third foaming was 8,700 ppm.

Figure 4A:
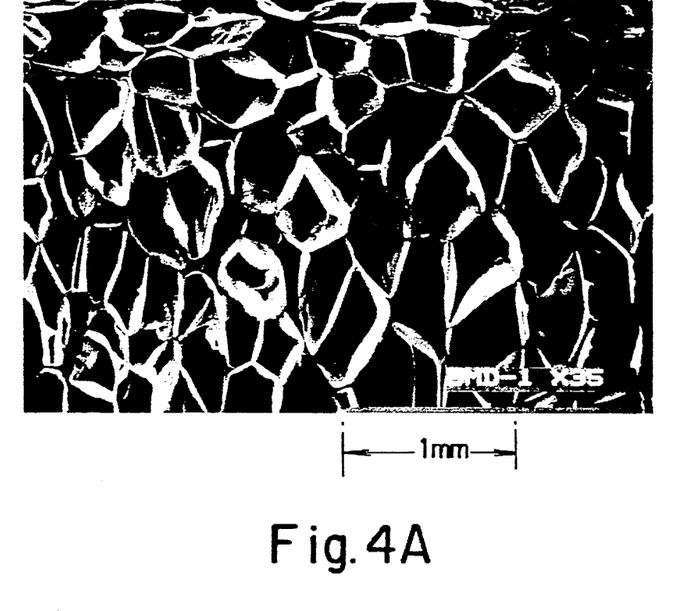
FIG. 4A shows the cross-section in the machine direction.
Figure 4B:
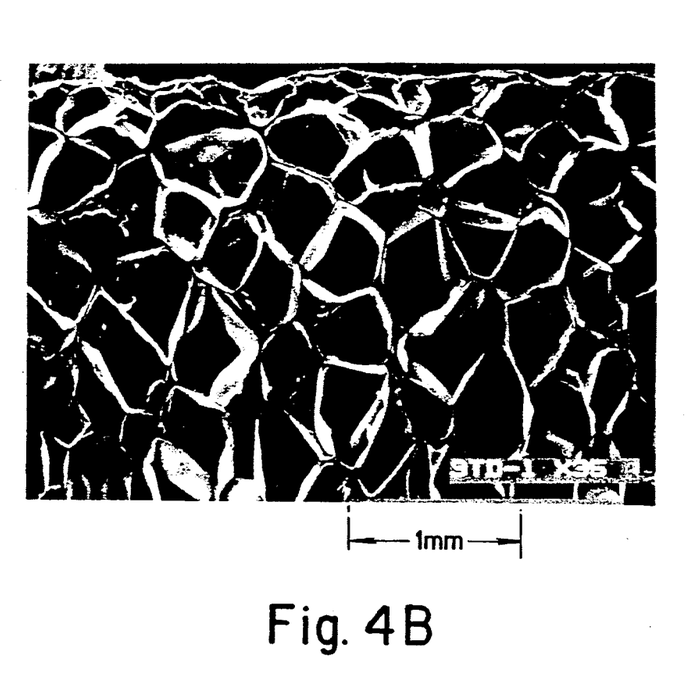
FIG. 4B shows the cross-section in the transverse direction.

Electron microscopic photographs of the cross-section of this thirdly foamed material are in FIG. 4, in which FIG. 4A shows the cross-section in the machine direction, and FIG. 4B shows the cross-section in the transverse direction.

EXAMPLE 2

By following the same procedures as in Example 1, a primarily foamed material and a secondarily foamed material were produced.

Production of Thirdly foamed Material:

By following the same procedures as in Example 1, except that the temperature of the iron plates for press heating was 120° C., a thirdly foamed material was produced. The thirdly foamed material obtained had a width of 600 mm, a length of 1000 mm, a thickness of 5.9 mm, a density of 0.059 g/cm$^3$, and an expansion ratio of 23 times.

EXAMPLE 3

A primarily foamed material was produced by the same manner as in Example 1.

Production of Secondarily foamed Material

By following the same procedure as in Example 1 except that the primarily foamed material was brought into contact with steam for 5 minutes, a secondarily foamed material was produced. The secondarily foamed material had a thickness of 4.1 mm, a density of 0.070 g/cm$^3$, and a crystallinity of 26%.

Production of Thirdly foamed Material:

A thirdly foamed material was produced from the secondarily foamed material by the same manner as in Example 1. The thirdly foamed material had a width of 600 mm, a length of 1000 mm, a thickness of 7.9 mm a density of 0.044 g/cm$^3$, and an expansion ratio of 31 times. In addition, the water content of the foamed material before the third foaming was 9,000 ppm.

EXAMPLE 4

A primarily foamed material and a secondarily foamed materials were produced by the same manners as in Example 1.

Production of Thirdly foamed Material:

A thirdly foamed material was produced from the secondarily foamed material as in Example 1 except that the contact time with the iron plates was changed to 10 seconds. The thirdly foamed material had a width of 600 mm, a length of 1000 mm, a thickness of 6.8 mm, a density of 0.052 g/cm$^3$, and an expansion ratio of 26 times.

EXAMPLE 5

A primarily foamed material and a secondarily foamed materials were produced by the same manners as in Example 1.

Production of Thirdly foamed Material:

A thirdly foamed material was produced from the secondarily foamed material as in Example 1, except that an oven containing air heated to 200° C. was used in place of the iron plates. The thirdly foamed material had a width of 600 mm, a length of 1000 mm, a thickness of 5.9 mm, a density of 0.060 g/$^3$, and an expansion ratio of 23 times.

EXAMPLE 6

A primarily foamed material was produced by the same manner as in Example 1.

Production of Secondarily foamed Material:

The primarily foamed material was brought into contact with warm water of 80° C. to provide a secondarily foamed material. The secondarily foamed material had a thickness of 2.7 mm, a density of 0.13 g/cm³, and a crystallinity of 10%.

Production of Thirdly foamed Material:

Five minutes after the production of the secondarily foamed material, the secondarily foamed material was placed between two iron plates of 140° C. and pressed for 6 seconds at a pressure of 21 g/cm², and after one second, the foamed material was placed between two iron plates each having a vessel-like concave or convex form of 180° C. and pressed for 16 seconds at a pressure of 21 g/cm² to provide a vessel-form foamed material. The vessel-form foamed material had a width of 120 mm, a length of 155 mm, a depth of 3 mm, a bottom thickness of 5.6 mm, a density of 0.063 g/cm³, and an expansion ratio of 22 times. In addition, the water content of the foamed material before the third foaming was 9,200 ppm.

COMPARISON EXAMPLE 1

A primarily foamed material and a secondarily foamed material were produced by the same manners as in Example 1 but the third foaming was not applied. The expansion ratio of the foamed material obtained was 17 times.

COMPARISON EXAMPLE 2

A primarily foamed material was produced by the same manner as in Example 1.

Production of Secondarily foamed Material:

A secondarily foamed material was produced from the primarily foamed material as in Example 1, except that the contact time with steam was changed to 7 minutes. The secondarily foamed material had a thickness of 5.4 mm, a density of 0.065 g/cm³, an expansion ratio of 21 times, and a crystallinity of 32%.

COMPARISON EXAMPLE 3

A primarily foamed material was produced by the same manner as in Example 1 and a secondarily foamed material was produced by the same manner as in Comparison Example 2.

Production of Thirdly foamed Material:

A thirdly foamed material was produced by the same manner as in Example 1. The thirdly foamed material had a width of 600 mm, a length of 1000 mm, a thickness of 5.4 mm, a density of 0.065 g/cm³, and an expansion ratio of 21 times, which showed no occurrence of third foaming.

COMPARISON EXAMPLE 4

A primarily foamed material was produced by the same manner as in Example 1 and a secondarily foamed material was produced by the same manner as in Example 3.

Production of Thirdly foamed Material:

A thirdly foamed material was produced from the secondarily foamed material by the same manner as in Example 1 except that the heating temperature by the iron plates was changed to 90° C. The thirdly foamed material had a width of 600 mm, a length of 1000 mm, a thickness of 4.1 mm, a density of 0.070 g/cm³, and an expansion ratio of 19 times, which showed no occurrence of third foaming.

EXAMPLE 7

Polyethylene terephthalate (TR8580, a trade name of Teijin Limited) was used as PAT and after drying PAT for 5 hours by hot blast having a dew point of −30° C. and a temperature of 160° C., the following composition was prepared.

| | |
|---|---|
| PAT | 100 parts |
| Talc | 0.6 part |
| Pyromellitic Anhydride | 0.4 part |
| Sodium Carbonate | 0.1 part |

The above-described components were placed in an extruding machine and extruded at a supply portion temperature of 280° C., a compressing portion temperature of 285° C., a melting portion temperature of 275° C., a head portion temperature of 275° C., and a die temperature of 270° C. and at a screw revolution number of 50 rpm in an extruding amount of 37 kg/hr. Also, nitrogen was incorporated under pressure in the composition from an intermediate portion of the barrel of the extruding machine as a foaming agent at a rate of 0.23% by weight.

An annular slit having a diameter of 60 mm and a gap of 0.4 mm was formed on the die and a cooling mandrel having a diameter of 205 mm and a length of 740 mm was equipped to the top of the die for suddenly cooling the foamed sheet with water of 30° C.

The foamed sheet thus obtained was opened by cutting to form a flat sheet to provide a primarily foamed sheet.

The primarily foamed sheet had a thickness of 0.9 mm, a basis weight of 369 g/m², a density of 0.41 g/cm³, and a crystallinity of 7.4%.

Then, the primarily foamed sheet was immersed in warm water of 80° C. for 3 minutes to carry out the secondary heating, whereby a secondarily foamed sheet having a thickness of 1.3 mm and a crystallinity of 8.1% was obtained.

Figure 1:
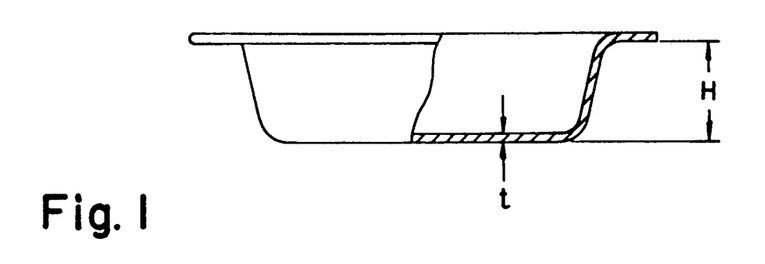
FIG. 1 is a partially cut side view of molded container obtained by press-molding a PAT formed sheet.
Figure 2:
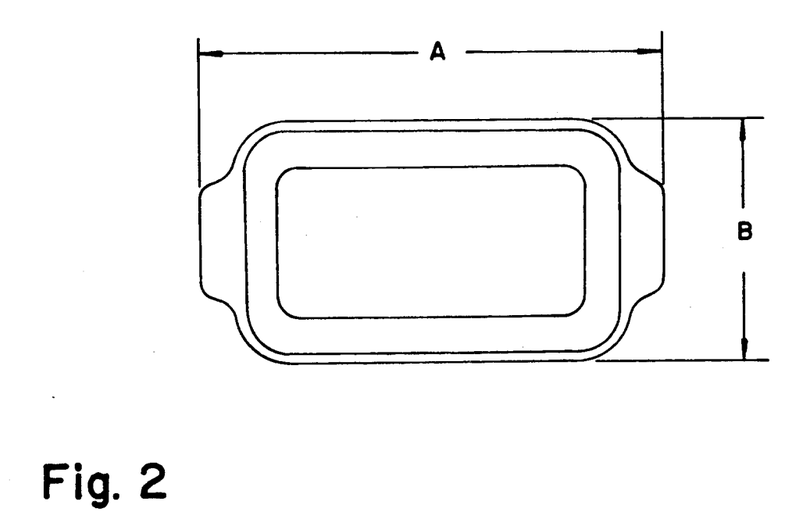
FIG. 2 is a plane view of the same container.

The secondarily foamed sheet was brought into contact with a hot plate having a surface temperature of 140° C. for 6 seconds to effect the third heating, whereby a thirdly foamed sheet was softened. Then, the sheet was placed between a male mold and a female mold having a surface temperature of 180° C for 16 seconds and press-molded to form a vessel as shown in FIGS. 1 and 2.

Thereafter, the molded article was quickly transferred into a cooling mold having the same form as the above-described mold and cooled for 6 seconds. The molding of the foamed material had a length A of 180 mm, a width B of 122 mm, a height H of 30 mm, a crystallinity of 22.8%, and a bottom thickness t of 3.1 mm.

For the sake of confirmation, the molding was subjected to retort treatment. For the retort treatment, the molding was placed in a pressure vessel, steam of 130° C. was blown into the vessel, and the molding was kept at the state for 20 minutes. Then, the molding was took out from the pressure vessel, cooled to room temperature, and the dimension of each part was measured. The results showed that length A was 179 mm, width B was 123 mm, height H was 30 mm, and bottom thickness t was 3.2 mm, and in the deformation ratios, A was 0.6%, B 0.8%, H 0%, and t 3.2%. That is, the molding was scarcely deformed, in particular, height H was not changed by the retort treatment. Thus, it was confirmed that the molding sufficiently endured the retort treatment. In addition, the deformation ratio was calculated by the following equation:

$$\text{Deformation ratio (\%)} = \frac{(a) - (b)}{(b)} \times 100$$

(a): the dimension after the retort treatment
(b): the dimension before the retort treatment Also, the strength of the molding was measured by applying a compressive distortion of 10% between the long side length ribs (between the sides facing to each other with a distance of width B) at a speed of 400 mm/min., and the strength in this case is defined as a nerve. The nerve was 432 g, which is a sufficient strength for holding the vessel containing foods by hands.

EXAMPLE 8

The primarily foamed sheet obtained in Example 7 was brought into contact with steam of 95° C. for 3 minutes to perform the secondary heating. The secondarily foamed sheet had a thickness of 2.2 mm and a crystallinity of 21.4%.

The secondarily foamed sheet was press-molded under the same condition as in Example 1. The crystallinity of the molding was 24.6% and the bottom thickness thereof was 4.0 mm.

The molding was subjected to the retort treatment by the same manner as Example 7. In the dimensions of the molding after the retort treatment, A was 179 mm, B 123 mm, H 30 mm, and t 4.1 mm, and in the deformation ratios is this case, A was 0.6%, B 0.8%, H 0%, and t 2.5%. That is, the dimensions of the molding scarcely changed and, in particular, H was not changed. Thus, it was confirmed that the molding could endure the retort treatment.

Also, the nerve of the molding was 599 g and the molding had a sufficient strength.

EXAMPLE 9

Polyethylene terephthalate (TR8580, a trade name of Teijin Limited) was used as PAT and after drying PAT as in Example 7, the following composition was prepared.

| PAT | 100 parts |
|---|---|
| Talc | 0.6 part |
| Pyromellitic Anhydride | 0.3 part |
| Sodium Carbonate | 0.1 part |

A primarily foamed sheet was produced by the same procedure as in Example 7 except that carbon dioxide was incorporated under pressure in as a foaming agent at a rate of 0.77% by weight.

The primarily foamed sheet had a thickness of 1.1 mm, a basis weight of 359 g/m$^2$, a density of 0.342 g/cm$^3$, and a crystallinity of 7.5%.

The primarily foamed sheet was immersed in warm water of 80° C. for 3 minutes to carry out the secondary heating. The secondarily foamed sheet obtained had a thickness of 1.3 mm and a crystallinity of 8.3%.

Then, the secondarily foamed sheet was press-molded by the same manner as in Example 7 to provide a vessel-form molding. The crystallinity of the molding was 23.0% and the bottom thickness thereof was 3.2 mm.

The molding was subjected to a retort treatment by the same manner as in Example 7. In the dimensions of the molding after the retort treatment, A was 179 mm, B 123 mm, H 30 mm, and t 3.25 mm, and in the deformation ratios thereof, A was 0.6%, B 0.85, H 0%, and t 1.6%. That is, the dimensions of the molding were scarcely changed by retort treatment and it was confirmed that the molding could endure the retort treatment. Also, the nerve was measured by the same manner as in Example 7 and confirmed to be 425 g, which showed a sufficient strength of the molding.

EXAMPLE 10

The primarily foamed sheet obtained in Example 9 was brought into contact with steam of 95° C. for 3 minutes to carry out the secondary heating. Thus, a secondarily foamed sheet having a crystallinity of 20.5% and a thickness of 2.3 mm was obtained. The secondarily foamed sheet was press-molded by the same manner as in Example 1 to provide a molding having a crystallinity of 24.3% and a bottom thickness of 3.9 mm.

The molding was subjected to the retort treatment by the same manner as in Example 7. In the dimensions of the molding after the treatment, A was 179 mm, B 123 mm, H 30 mm, and t 4.0 mm, and in the deformation ratios, A was 0.6, B 0.85, H 0%, and t 2.6%. That is, the dimensions of the molding were scarcely changed by the treatment and, hence, it was confirmed that the molding could endure the retort treatment.

Also, the nerve thereof was measured by the same manner as in Example 1 and confirmed to be 587 g.

COMPARISON EXAMPLE 5

The primarily foamed sheet obtained in Example 7 was press-molding by the same manner as in Example 7 without carrying out the secondary foaming in warm water to provide a vessel-form molding. The crystallinity of the molding was 22.3% and the thickness thereof was 1.3 mm.

The molding was subjected to the retort treatment by the same manner as in Example 7. In the dimensions of the molding after the retort treatment, A was 179 mm, B 123 mm, H 29 mm, and t 1.4 mm, and in the deformation ratios, A was 0.6%, B 0.8%, H −3.3%, and t 7.7%. In particular, since the deformation ratio of H was −3.3%, it was confirmed that the molding was deformed. Also, the nerve of the molding was measured and confirmed to be 318 g. This value showed the molding was weak for holding the molded vessel containing foods by hands.

COMPARISON EXAMPLE 6

The primarily foamed sheet obtained in Example 9 was press-molding by the same manner as in Example 7 without subjecting the secondary heating in a warm water to provide a vessel-forming mold. The crystallinity of the molding was 22.8% and the thickness thereof was 1.4 mm.

The molding was subjected to the retort treatment by the same manner as in Example 7. The dimensions of the molding after the retort treatment, A was 179 mm, N 123 mm, H 29 mm, and t 1.5 mm, and in the deformation ratios, A was 0.6%, B 9.8%, and H −3.3%. The large deformation ratio of H showed that the molding was deformed. Also, when the nerve of the molding was measured, the nerve was 327 g. The value showed that the molding was weak for holding the molded vessel containing foods by hands.

COMPARISON EXAMPLE 7

In the comparison example, butane was used as a foaming agent.

After drying PAT as used in Example 7 by the same manner as in Example 1, the following composition was prepared using the PAT.

| PAT | 100 parts |
|---|---|
| Talc | 0.6 part |
| Pyromellitic Anhydride | 0.37 part |
| Sodium Carbonate | 0.1 part |

The above components were extruded by the same manner as in Example 7 except that the screw revolution number was 25 rpm, the extruded amount was 27 kg/hr, and 1.4% by weight of butane was used as a foaming agent to provide a primarily foamed sheet.

The primarily foamed sheet obtained had a thickness of 1.3 mm, a basis weight of 350 g/m$^2$, a density of 0.269 g/cm$^3$, and a crystallinity of 7.8%.

The primarily foamed sheet was press-molded by the same manner as in Example 7 without applying the secondary heating. The molding obtained had a bottom thickness of 3.5 mm and a crystallinity of 24.8%.

The molding was subjected to the retort treatment by the same manner as in Example 7. In the dimensions of the molding after the retort treatment, A was 177 mm, B 125 mm, H 28 mm, and t 3.8 mm, and in the deformation ratios, A was 1.7%, B 2.5%, H −6.6%, and t 8.6%. The surface of the molding was unevened. Since the molding had a particularly large deformation ratio of H, the molding did not have a resistance to the retort treatment.

In addition, when the nerve of the molding was measured, the nerve was 450 g. Thus, the nerve was sufficient.

While the invention has been described in detail and with reference to specific embodiments thereof, it will be apparent to one skilled in the art that various changes and modifications can be made therein without departing from the spirit and scope thereof.

What is claimed is:

1. A thermoplastic polyester series resin foamed material having a crystallinity of not higher than 30% and a water content of at least 2,000 ppm.

2. A thermoplastic polyester series resin foamed molding having a crystallinity exceeding 30% produced by the process comprising heating and further foaming a thermoplastic polyester series resin foamed material having a crystallinity of not higher than 30% and a water content of at least 2000 ppm by ringing into contact with water or steam of at least 60° C., heating and further foaming the foamed material by bringing into contact with a heating medium other than water of at least 100° C., and molding the foamed material by a mold.

* * * * *